(12) United States Patent
Sen et al.

(10) Patent No.: US 9,043,491 B2
(45) Date of Patent: *May 26, 2015

(54) PROXIMITY DETECTION FOR MEDIA PROXIES

(71) Applicant: Apple Inc., Cupertino, CA (US)

(72) Inventors: Sanjoy Sen, Plano, TX (US); Sean March, Plano, TX (US); Cedric Aoun, Boulogne-Billancourt (FR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,254

(22) Filed: Feb. 6, 2014

(65) Prior Publication Data
US 2014/0156868 A1 Jun. 5, 2014

Related U.S. Application Data

(63) Continuation of application No. 13/756,075, filed on Jan. 31, 2013, now Pat. No. 8,694,676, which is a continuation of application No. 10/245,476, filed on Sep. 17, 2002, now Pat. No. 8,392,609.

(51) Int. Cl.
G06F 15/173 (2006.01)
H04L 12/707 (2013.01)
(Continued)

(52) U.S. Cl.
CPC .......... H04L 45/22 (2013.01); H04L 29/06027 (2013.01); H04L 65/1006 (2013.01); H04L 65/104 (2013.01); H04L 65/1096 (2013.01);
(Continued)

(58) Field of Classification Search
CPC .... H04L 65/16; H04L 65/103; H04L 65/1036
USPC .......... 709/223–224, 227, 228, 239; 370/241, 370/252
See application file for complete search history.

(56) References Cited

U.S. PATENT DOCUMENTS 4,932,050 A 6/1990 Davidson et al.
5,315,636 A 5/1994 Patel
(Continued)

FOREIGN PATENT DOCUMENTS

EP 1071295 1/2001
EP 1 148 688 10/2001
(Continued)

OTHER PUBLICATIONS

Krisela Rivera et al., "The Effect of Emotional Icons on Remote Communications," CHI 96 Interactive Posters, New Mexico State University Department of Psychology, Las Cruces, NM, Apr. 13-18, 1996, pp. 99-100.

(Continued)

Primary Examiner — Thu Ha Nguyen
(74) Attorney, Agent, or Firm — Meyertons, Hood, Kivlin, Kowert & Goetzel, P.C.

(57) ABSTRACT

A method of detecting proximity between a media proxy and a client uses a proximity probe to query a plurality of media proxies, forcing the media proxies to respond to a proximity server. The proximity server uses an algorithm to determine which media proxy is closest to the client based on the responses. In an alternate embodiment, the same sorts of proximity probes may be used to determine if two media endpoints have a direct connection such that they may bypass a media proxy.

17 Claims, 3 Drawing Sheets

(51) Int. Cl.
*H04L 29/06* (2006.01)
*H04L 29/08* (2006.01)

(52) U.S. Cl.
CPC .......... *H04L 65/1026* (2013.01); *H04L 65/103* (2013.01); *H04L 65/1036* (2013.01); *H04L 67/16* (2013.01)

(56) References Cited

U.S. PATENT DOCUMENTS

| | | | |
|---|---|---|---|
| 5,327,521 A | 7/1994 | Savic et al. | |
| 5,347,306 A | 9/1994 | Nitta | |
| 5,353,335 A | 10/1994 | D'Urso et al. | |
| 5,414,759 A | 5/1995 | Ishikuri et al. | |
| 5,450,613 A | 9/1995 | Takahara et al. | |
| 5,541,981 A | 7/1996 | Lynn | |
| 5,550,907 A | 8/1996 | Carlsen | |
| 5,555,376 A | 9/1996 | Theimer et al. | |
| 5,586,171 A | 12/1996 | McAllister et al. | |
| 5,596,633 A | 1/1997 | Meier et al. | |
| 5,633,921 A | 5/1997 | Soderberg | |
| 5,633,924 A | 5/1997 | Kaish et al. | |
| 5,652,789 A | 7/1997 | Miner et al. | |
| 5,742,905 A | 4/1998 | Pepe et al. | |
| 5,749,073 A | 5/1998 | Slaney | |
| 5,757,901 A | 5/1998 | Hiroshige | |
| 5,771,280 A | 6/1998 | Johnson | |
| 5,790,649 A | 8/1998 | Hiroshige | |
| 5,812,126 A | 9/1998 | Richardson et al. | |
| 5,812,865 A | 9/1998 | Theimer et al. | |
| 5,812,972 A | 9/1998 | Juang et al. | |
| 5,815,554 A | 9/1998 | Burgess et al. | |
| 5,818,836 A | 10/1998 | Du Val | |
| 5,825,864 A | 10/1998 | McGraw et al. | |
| 5,835,568 A | 11/1998 | Bass et al. | |
| 5,848,134 A | 12/1998 | Sekiguchi et al. | |
| 5,860,064 A | 1/1999 | Henton | |
| 5,864,848 A | 1/1999 | Horvitz et al. | |
| 5,870,709 A | 2/1999 | Bernstein | |
| 5,875,427 A | 2/1999 | Yamazaki | |
| 5,880,731 A | 3/1999 | Liles et al. | |
| 5,884,029 A | 3/1999 | Brush, II et al. | |
| 5,884,262 A | 3/1999 | Wise et al. | |
| 5,890,115 A | 3/1999 | Cole | |
| 5,901,359 A | 5/1999 | Malmstrom | |
| 5,911,129 A | 6/1999 | Towell | |
| 5,930,702 A | 7/1999 | Goldman et al. | |
| 5,933,805 A | 8/1999 | Boss et al. | |
| 5,960,173 A | 9/1999 | Tang et al. | |
| 6,031,904 A | 2/2000 | An et al. | |
| 6,038,443 A | 3/2000 | Luneau | |
| 6,052,597 A | 4/2000 | Ekstrom | |
| 6,058,415 A | 5/2000 | Polcyn | |
| 6,067,357 A | 5/2000 | Kishinsky et al. | |
| 6,085,232 A | 7/2000 | Kikinis | |
| 6,104,913 A | 8/2000 | McAllister | |
| 6,111,937 A | 8/2000 | Kuroiwa et al. | |
| 6,125,176 A | 9/2000 | Foladare et al. | |
| 6,134,314 A | 10/2000 | Dougherty et al. | |
| 6,141,356 A | 10/2000 | Gorman | |
| 6,144,644 A | 11/2000 | Bajzath et al. | |
| 6,148,328 A | 11/2000 | Cuomo et al. | |
| 6,173,250 B1 | 1/2001 | Jong | |
| 6,173,262 B1 | 1/2001 | Hirschberg | |
| 6,175,616 B1 | 1/2001 | Light et al. | |
| 6,185,292 B1 | 2/2001 | Miloslavsky | |
| 6,185,565 B1 | 2/2001 | Meubus et al. | |
| 6,185,619 B1 * | 2/2001 | Joffe et al. ................... 709/229 | |
| 6,215,858 B1 | 4/2001 | Bartholomew et al. | |
| 6,223,165 B1 | 4/2001 | Lauffer | |
| 6,226,361 B1 | 5/2001 | Koyama | |
| 6,233,465 B1 | 5/2001 | Smith et al. | |
| 6,243,398 B1 | 6/2001 | Kahane et al. | |
| 6,253,230 B1 * | 6/2001 | Couland et al. ............ 709/203 | |
| 6,260,070 B1 * | 7/2001 | Shah ............................ 709/230 | |
| 6,260,148 B1 | 7/2001 | Aggarwal et al. | |
| 6,282,511 B1 | 8/2001 | Mayer | |
| 6,295,348 B1 | 9/2001 | Bleile et al. | |
| 6,301,609 B1 | 10/2001 | Aravamudan et al. | |
| 6,314,094 B1 | 11/2001 | Boys | |
| 6,317,486 B1 | 11/2001 | Hollins et al. | |
| 6,324,265 B1 | 11/2001 | Christie, IV et al. | |
| 6,330,322 B1 | 12/2001 | Foladare et al. | |
| 6,356,937 B1 | 3/2002 | Montville et al. | |
| 6,366,651 B1 | 4/2002 | Griffith et al. | |
| 6,366,886 B1 | 4/2002 | Dragosh et al. | |
| 6,377,944 B1 | 4/2002 | Busey et al. | |
| 6,385,461 B1 | 5/2002 | Raith | |
| 6,389,114 B1 | 5/2002 | Dowens et al. | |
| 6,389,127 B1 | 5/2002 | Vardi et al. | |
| 6,418,198 B2 | 7/2002 | Brablec et al. | |
| 6,424,935 B1 | 7/2002 | Taylor | |
| 6,430,289 B1 | 8/2002 | Liffick | |
| 6,430,395 B2 | 8/2002 | Arazi et al. | |
| 6,430,604 B1 | 8/2002 | Ogle et al. | |
| 6,434,599 B1 | 8/2002 | Porter | |
| 6,446,076 B1 | 9/2002 | Burkey et al. | |
| 6,446,121 B1 * | 9/2002 | Shah et al. ................... 709/224 | |
| 6,449,344 B1 | 9/2002 | Goldfinger et al. | |
| 6,449,365 B1 | 9/2002 | Hodges et al. | |
| 6,453,294 B1 | 9/2002 | Dutta et al. | |
| 6,463,142 B1 | 10/2002 | Kilp | |
| 6,463,471 B1 | 10/2002 | Dreke et al. | |
| 6,480,593 B1 | 11/2002 | Munday et al. | |
| 6,483,900 B1 | 11/2002 | Light et al. | |
| 6,484,196 B1 | 11/2002 | Maurille | |
| 6,507,643 B1 | 1/2003 | Groner | |
| 6,519,639 B1 | 2/2003 | Glasser et al. | |
| 6,546,096 B1 | 4/2003 | Meiden et al. | |
| 6,549,937 B1 | 4/2003 | Auerbach et al. | |
| 6,560,648 B1 * | 5/2003 | Dunn et al. .................. 709/224 | |
| 6,564,261 B1 | 5/2003 | Gudjonsson et al. | |
| 6,584,494 B1 | 6/2003 | Manabe et al. | |
| 6,617,969 B2 | 9/2003 | Tu et al. | |
| 6,618,704 B2 | 9/2003 | Kanevsky et al. | |
| 6,618,710 B1 | 9/2003 | Zondervan et al. | |
| 6,633,636 B1 | 10/2003 | McConnell et al. | |
| 6,640,241 B1 | 10/2003 | Ozzie et al. | |
| 6,654,790 B2 | 11/2003 | Ogle et al. | |
| 6,658,095 B1 | 12/2003 | Yoakum et al. | |
| 6,665,395 B1 | 12/2003 | Busey et al. | |
| 6,678,719 B1 | 1/2004 | Stimmel | |
| 6,700,966 B2 | 3/2004 | Takagi et al. | |
| 6,711,137 B1 * | 3/2004 | Klassen et al. .............. 370/252 | |
| 6,728,754 B1 | 4/2004 | Lipton | |
| 6,741,853 B1 | 5/2004 | Jiang et al. | |
| 6,799,209 B1 | 9/2004 | Hayton | |
| 6,807,423 B1 | 10/2004 | Armstrong et al. | |
| 6,810,411 B1 * | 10/2004 | Coughlin et al. ............ 709/203 | |
| 6,885,641 B1 * | 4/2005 | Chan et al. ................... 370/252 | |
| 6,920,498 B1 * | 7/2005 | Gourlay et al. ............. 709/227 | |
| 6,985,961 B1 | 1/2006 | Ramsayer et al. | |
| 7,020,480 B2 | 3/2006 | Coskun et al. | |
| 7,035,923 B1 | 4/2006 | Yoakum et al. | |
| 7,103,651 B2 | 9/2006 | Bohannon et al. | |
| 7,136,631 B1 | 11/2006 | Jiang et al. | |
| 7,212,617 B2 | 5/2007 | Owens et al. | |
| 7,269,162 B1 | 9/2007 | Turner | |
| 7,356,137 B1 | 4/2008 | Burg et al. | |
| 7,945,678 B1 * | 5/2011 | Skene ........................... 709/227 | |
| 8,180,875 B1 * | 5/2012 | Dave' et al. ................. 709/223 | |
| 8,279,759 B1 * | 10/2012 | Jones .......................... 370/248 | |
| 2001/0005412 A1 | 6/2001 | Light et al. | |
| 2001/0039585 A1 * | 11/2001 | Primak et al. ............... 709/228 | |
| 2001/0044299 A1 | 11/2001 | Sandegren | |
| 2001/0053213 A1 | 12/2001 | Truong et al. | |
| 2001/0053214 A1 | 12/2001 | Kleinoder et al. | |
| 2002/0006803 A1 | 1/2002 | Mendiola et al. | |
| 2002/0024947 A1 | 2/2002 | Luzzatti et al. | |
| 2002/0032035 A1 | 3/2002 | Teshima | |
| 2002/0035605 A1 | 3/2002 | McDowell et al. | |
| 2002/0038360 A1 * | 3/2002 | Andrews et al. ............ 709/223 | |
| 2002/0049842 A1 * | 4/2002 | Huetsch et al. ............. 709/225 | |
| 2002/0055975 A1 | 5/2002 | Petrovykh | |

(56) References Cited

U.S. PATENT DOCUMENTS

| | | | |
|---|---|---|---|
| 2002/0059622 A1 | 5/2002 | Grove et al. | |
| 2002/0060988 A1 | 5/2002 | Shtivelman | |
| 2002/0065894 A1 | 5/2002 | Dalal et al. | |
| 2002/0076010 A1 | 6/2002 | Sahai | |
| 2002/0078188 A1* | 6/2002 | Anand et al. | 709/222 |
| 2002/0085516 A1 | 7/2002 | Bridgelall | |
| 2002/0101993 A1 | 8/2002 | Eskin | |
| 2002/0102993 A1 | 8/2002 | Hendrey et al. | |
| 2002/0111173 A1 | 8/2002 | Hendrey et al. | |
| 2002/0114432 A1 | 8/2002 | Shaffer et al. | |
| 2002/0116336 A1 | 8/2002 | Diacakis et al. | |
| 2002/0116461 A1 | 8/2002 | Diacakis et al. | |
| 2002/0120687 A1 | 8/2002 | Diacakis et al. | |
| 2002/0126701 A1 | 9/2002 | Requena | |
| 2002/0131395 A1 | 9/2002 | Wang | |
| 2002/0133597 A1* | 9/2002 | Jhingan et al. | 709/228 |
| 2002/0143876 A1 | 10/2002 | Boyer et al. | |
| 2002/0143877 A1 | 10/2002 | Hackbarth et al. | |
| 2002/0147008 A1 | 10/2002 | Kallio | |
| 2002/0147777 A1 | 10/2002 | Hackbarth et al. | |
| 2002/0147814 A1 | 10/2002 | Kimchi et al. | |
| 2002/0161755 A1* | 10/2002 | Moriarty | 707/4 |
| 2002/0163572 A1 | 11/2002 | Center et al. | |
| 2002/0163882 A1* | 11/2002 | Bornstein et al. | 370/227 |
| 2002/0165000 A1 | 11/2002 | Fok | |
| 2002/0181693 A1 | 12/2002 | Ribera | |
| 2002/0186685 A1* | 12/2002 | O'Brien et al. | 370/352 |
| 2002/0194335 A1* | 12/2002 | Maynard | 709/225 |
| 2002/0196770 A1 | 12/2002 | Lin | |
| 2003/0004762 A1 | 1/2003 | Banerjee et al. | |
| 2003/0009591 A1* | 1/2003 | Hayball et al. | 709/245 |
| 2003/0018704 A1 | 1/2003 | Polychronidis et al. | |
| 2003/0023623 A1 | 1/2003 | Horvitz et al. | |
| 2003/0023681 A1 | 1/2003 | Brown et al. | |
| 2003/0026289 A1 | 2/2003 | Mukherjee et al. | |
| 2003/0028621 A1 | 2/2003 | Furlong et al. | |
| 2003/0035529 A1 | 2/2003 | Baker | |
| 2003/0037103 A1 | 2/2003 | Salmi et al. | |
| 2003/0037113 A1 | 2/2003 | Petrovykh | |
| 2003/0041101 A1 | 2/2003 | Hansche et al. | |
| 2003/0048195 A1 | 3/2003 | Trossen | |
| 2003/0052915 A1 | 3/2003 | Brown et al. | |
| 2003/0055897 A1 | 3/2003 | Brown et al. | |
| 2003/0059029 A1 | 3/2003 | Mengshoel et al. | |
| 2003/0065721 A1 | 4/2003 | Roskind | |
| 2003/0065788 A1 | 4/2003 | Salomaki | |
| 2003/0069934 A1 | 4/2003 | Garcia-Martin et al. | |
| 2003/0073440 A1 | 4/2003 | Mukherjee et al. | |
| 2003/0078979 A1 | 4/2003 | Sagi | |
| 2003/0093482 A1 | 5/2003 | Watanabe et al. | |
| 2003/0101278 A1* | 5/2003 | Garcia-Luna-Aceves et al. | 709/240 |
| 2003/0104819 A1 | 6/2003 | Knauerhase et al. | |
| 2003/0105820 A1 | 6/2003 | Haims et al. | |
| 2003/0129972 A1 | 7/2003 | Tosaki et al. | |
| 2003/0134638 A1 | 7/2003 | Sundar et al. | |
| 2003/0135624 A1 | 7/2003 | McKinnon et al. | |
| 2003/0145081 A1* | 7/2003 | Lau et al. | 709/224 |
| 2003/0154293 A1 | 8/2003 | Zmolek | |
| 2003/0174814 A1 | 9/2003 | Diacakis | |
| 2003/0181693 A1 | 9/2003 | Cook et al. | |
| 2003/0206619 A1 | 11/2003 | Curbow et al. | |
| 2003/0217099 A1 | 11/2003 | Bobde et al. | |
| 2003/0217142 A1 | 11/2003 | Bobde et al. | |
| 2003/0225848 A1 | 12/2003 | Heikes et al. | |
| 2003/0229722 A1 | 12/2003 | Beyda | |
| 2003/0233537 A1 | 12/2003 | Wohlgemuth et al. | |
| 2003/0235287 A1 | 12/2003 | Margolis | |
| 2004/0037271 A1 | 2/2004 | Liscano et al. | |
| 2004/0044647 A1 | 3/2004 | Samenkaita | |
| 2004/0054805 A1* | 3/2004 | Sen et al. | 709/240 |
| 2004/0059781 A1 | 3/2004 | Yoakum et al. | |
| 2004/0072593 A1 | 4/2004 | Robbins et al. | |
| 2004/0073614 A1 | 4/2004 | Blohm | |
| 2004/0122810 A1 | 6/2004 | Mayer | |
| 2004/0122901 A1 | 6/2004 | Sylvain | |
| 2004/0125941 A1 | 7/2004 | Yoakum | |
| 2004/0153506 A1 | 8/2004 | Ito et al. | |
| 2004/0172528 A1 | 9/2004 | Tenereillo | |
| 2004/0174966 A1 | 9/2004 | Koch | |
| 2004/0177278 A1 | 9/2004 | Lipton | |
| 2004/0203746 A1 | 10/2004 | Knauerhase et al. | |
| 2004/0203927 A1 | 10/2004 | Kraft | |
| 2004/0210670 A1* | 10/2004 | Anerousis et al. | 709/238 |
| 2004/0249776 A1 | 12/2004 | Horvitz et al. | |
| 2004/0266398 A1 | 12/2004 | Adamczyk et al. | |
| 2005/0041580 A1 | 2/2005 | Petrovykh | |
| 2005/0044144 A1 | 2/2005 | Malik et al. | |
| 2005/0044234 A1* | 2/2005 | Coughlin et al. | 709/227 |
| 2005/0074101 A1 | 4/2005 | Moore et al. | |
| 2005/0086211 A1 | 4/2005 | Mayer | |
| 2005/0117570 A1 | 6/2005 | Cetusic et al. | |
| 2005/0159153 A1 | 7/2005 | Mousseau et al. | |
| 2005/0172011 A1* | 8/2005 | Gourlay et al. | 709/219 |
| 2006/0003766 A1 | 1/2006 | Parameswar et al. | |
| 2006/0078101 A1 | 4/2006 | Light et al. | |
| 2007/0061282 A1* | 3/2007 | Ganguly et al. | 707/1 |
| 2007/0094361 A1* | 4/2007 | Hoynowski et al. | 709/220 |
| 2007/0189489 A1 | 8/2007 | Carnazza et al. | |
| 2007/0208874 A1* | 9/2007 | Previdi et al. | 709/238 |
| 2008/0008089 A1* | 1/2008 | Bornstein et al. | 370/227 |
| 2010/0149998 A1* | 6/2010 | Schryer et al. | 370/248 |
| 2010/0217975 A1* | 8/2010 | Grajek et al. | 713/157 |
| 2011/0035497 A1* | 2/2011 | Daly et al. | 709/226 |
| 2012/0246273 A1* | 9/2012 | Bornstein et al. | 709/217 |
| 2014/0122732 A1* | 5/2014 | Duan et al. | 709/228 |
| 2014/0236330 A1* | 8/2014 | Framel et al. | 700/91 |

FOREIGN PATENT DOCUMENTS

| | | |
|---|---|---|
| EP | 1 225 752 | 7/2002 |
| EP | 1 329 810 | 7/2003 |
| EP | 1459508 | 9/2004 |
| NO | 20043067 | 9/2004 |
| WO | 99/17194 | 4/1999 |
| WO | 99/34628 | 7/1999 |
| WO | 0135615 | 5/2001 |
| WO | 03056799 | 7/2003 |
| WO | 03058921 | 7/2003 |
| WO | 2004057816 | 3/2004 |
| WO | 2004028114 | 4/2004 |
| WO | 2007045947 | 4/2007 |

OTHER PUBLICATIONS

Notice of Allowance for U.S. Appl. No. 10/101,286 mailed Aug. 11, 2003, pp. 1-10.

Day et al., "Instant Messaging/Presence Protocol Requirements," Request for Comment (RFC) 2779, Feb. 2000, pp. 1-53.

Crocker, D. et al., "A Common Profile for Instant Messaging (CPIM)," (work in progress), Feb. 2001, pp. 1-75.

Notice of Allowance for U.S. Appl. No. 10/119,923 mailed Jun. 16, 2006, pp. 1-2.

Notice of Allowance for U.S. Appl. No. 10/119,923 mailed Mar. 8, 2006, pp. 1-2.

Notice of Allowance for U.S. Appl. No. 10/119,923 mailed Jan. 12, 2006, pp. 1-4.

Notice of Allowance for U.S. Appl. No. 10/119,923 mailed Aug. 5, 2005, pp. 1-7.

Non-final Office Action for U.S. Appl. No. 10/119,923 mailed Feb. 23, 2005, pp. 1-7.

Advisory Advisory for U.S. Appl. No. 10/119,923 mailed Nov. 29, 2004, pp. 1-3.

Final Office Action for U.S. Appl. No. 10/119,923 mailed Sep. 13, 2004, pp. 1-10.

Non-final Office Action for U.S. Appl. No. 10/119,923 mailed Feb. 6, 2004, pp. 1-7.

Notice of Allowance for U.S. Appl. No. 10/262,393 mailed May 15, 2009, pp. 1-3.

Notice of Allowance for U.S. Appl. No. 10/262,393 mailed Feb. 23, 2009, pp. 1-7.

(56) References Cited

OTHER PUBLICATIONS

Final Office Action for U.S. Appl. No. 10/262,393 mailed Jan. 25, 2008, pp. 1-5.
Non-final Office Action for U.S. Appl. No. 10/262,393 mailed Jul. 9, 2007, pp. 1-7.
Final Office Action for U.S. Appl. No. 10/262,393 mailed Jul. 24, 2006, pp. 1-6.
Non-final Office Action for U.S. Appl. No. 10/262,393 mailed Jan. 24, 2006, pp. 1-6.
Non-final Office Action for U.S. Appl. No. 10/262,393 mailed Aug. 23, 2005, pp. 1-5.
Advisory Action for U.S. Appl. No. 10/262,393 mailed May 4, 2005, pp. 1-3.
Final Office Action for U.S. Appl. No. 10/262,393 mailed Feb. 23, 2005, pp. 1-6.
Non-final Office Action for U.S. Appl. No. 10/262,393 mailed Jul. 7, 2004, pp. 1-4.
Notice of Allowance for U.S. Appl. No. 10/336,523 mailed Dec. 15, 2009, pp. 1-6.
Board of Patent Appeals and Interferences Decision for U.S. Appl. No. 10/336,523 mailed Sep. 9, 2009, pp. 1-14.
Examiner's Answer to Appeal Brief for U.S. Appl. No. 10/336,523 mailed Oct. 30, 2007, pp. 1-11.
Advisory Action for U.S. Appl. No. 10/336,523 mailed Mar. 26, 2007, pp. 1-4.
Final Office Action for U.S. Appl. No. 10/336,523 mailed Jan. 4, 2007, pp. 1-10.
Non-final Office Action for U.S. Appl. No. 10/336,523 mailed Jun. 2, 2006, pp. 1-7.
Handley, M. et al. "SIP: Session Initiated Protocol, RFC 2543," Mar. 1999, pp. 1-119.
Advisory Action for U.S. Appl. No. 10/079,237 mailed Oct. 6, 2008, pp. 1-7.
Notice of Allowance for U.S. Appl. No. 10/036,247 (now US patent 7,299,286) mailed Jul. 12, 2007, pp. 1-4.
Non-final Office action for U.S. Appl. No. 10/036,247 {now US patent 7,299,286) mailed Nov. 1, 2006, pp. 1-5.
Advisory Action for U.S. Appl. No. 10/036,247 (now US patent 7,299,286) mailed Dec. 27, 2005, pp. 1-3.
Final Office Action for U.S. Appl. No. 10/036,247 (now US patent 7,299,286) mailed Aug. 25, 2005, pp. 1-15.
Non-final Office action for U.S. Appl. No. 10/036,247 {now US patent 7,299,286) mailed Apr. 28, 2005, pp. 1-13.
Advisory Notice for U.S. Appl. No. 10/247,591 mailed Jan. 9, 2009, pp. 1-6.
Non-final Office Action for U.S. Appl. No. 10/247,591 mailed Apr. 7, 2008, pp. 1-13.
Non-final Office Action for U.S. Appl. No. 10/247,591 mailed Apr. 19, 2007, pp. 1-12.
Non-final Office Action for U.S. Appl. No. 10/247,591 mailed Oct. 9, 2007, pp. 1-11.
Non-final Office Action for U.S. Appl. No. 10/247,591 mailed Nov. 2, 2006, pp. 1-2.
Final Office Action for U.S. Appl. No. 10/247,591 mailed Jul. 14, 2006, pp. 1-12.
Non-final Office Action for U.S. Appl. No. 10/247,591 mailed Jan. 6, 2006, pp. 1-11.
Advisory Action for U.S. Appl. No. 10/325,144 mailed Mar. 5, 2007, pp. 1-15.
Final Office Action for U.S. Appl. No. 10/325,144 mailed Dec. 18, 2006, pp. 1-12.
Non-final Office Action for U.S. Appl. No. 10/325,144 mailed Jul. 3, 2006, pp. 1-8.
Examiner's Answer to Appeal Brief for U.S. Appl. No. 10/079,237 mailed Feb. 25, 2010, pp. 1-10.
Examiner's Answer to Appeal Brief for U.S. Appl. No. 10/079,237 mailed Feb. 23, 2010, pp. 1-9.
Final Office Action for U.S. Appl. No. 10/079,237 mailed May 12, 2009, pp. 1-9.
Non-final Office Action for U.S. Appl. No. 10/079,237 mailed Nov. 26, 2008, pp. 1-8.
Day, M.; Rosenberg, J.; "Request for Comments (RFC) 2778: A Model for Presence and Instant Messaging;" IETF—Network Working Group, Information Memo, Feb. 2000, XP002201444.
Rosenberg, J.; Schulzrinne, H.; "draft-rosenberg-sip-pip.00.txt: SIP for Presence;" IETF Internet Draft, Nov. 13, 1998, pp. 1-22,XP002325320.
Brodsky et al.; "Resource Management in Agent-based Distributed Environments;" Proceedings of the 1999 International Symposium on Kyoto, Japan, Nov. 28-30, 1999, pp. 95-108, XP010379697.
Chapin et al.; "Resource Management in Legion;" Future Generations Computer Systems, Elsevier Science Publishers, Amsterdam, Netherlands, vol. 15, No. 5-6, Oct. 1999, pp. 583-594, XP004176748.
Krauter et al.; "A Taxonomy and Survey of Grid Resource Management Systems for Distributed Computing;" Software Practice & Experience, John Wiley & Sons Ltd., Chichester, Great Britain, vol. 32, No. 2, Feb. 2, 2002, pp. 135-164,XP001091827.
Day et al.; "A Model for Presence and Instant Messaging;" IETF Request for Comments, No. 2778, Feb. 2000, pp. 1-17.
Rosenberg et al.; "SIP for Presence;" IETF Internet Draft, Nov. 13, 1998, XP002173451.
Shim et al.; "An Example of Using Presence and Availability in an Enterprise for Spontaneous, Multiparty, Multimedia Communications;" IPTEL 2001, Apr. 3, 2001, XP002252324.
Eschenburg, Axel; "Wo Laufen Sie Denn? ICQ Haelt Verbindung Zu Bekannten;" CT Magazin Fuer Computer Technik, Verlag Heinz Heise GMBH, Hannover, Germany, No. 22, Oct. 26, 1998; pp. 92-95, Translation Provided.
Kohda et al.; "IMPP: A New Instant Messaging Standard and Its Impact on Internet Business;" Fujitsu—Scientific and Technical Journal, Fujitsu Limited, Kawasaki, Japan, vol. 36, No. 2, Dec. 2000, pp. 147-153.
U.S. Appl. No. 13/756,075, filed Jan. 31, 2013, Sanjoy Sen et al.
U.S. Appl. No. 10/245,476, filed Sep. 17, 2002, Sanjoy Sen.

* cited by examiner

PROXIMITY DETECTION FOR MEDIA PROXIES

CROSS-REFERENCE TO RELATED APPLICATIONS

This application is a continuation of U.S. patent application Ser. No. 13/756,075, entitled "Proximity Detection for Media Proxies", filed Jan. 31, 2013, which is a continuation of U.S. patent application Ser. No. 10/245,476, entitled "Proximity Detection for Media Proxies", filed Sep. 17, 2002, which is hereby incorporated by reference in its entirety as though fully and completely set forth herein.

FIELD OF THE INVENTION

The present invention relates to a technique to determine a best path over which a multimedia communication session may be held.

BACKGROUND OF THE INVENTION

Consumers of telecommunications services are faced with many options when it comes to services. One of the more dynamic fields currently is the provision of multimedia services. Typically, a consumer will request multimedia services by accessing an application server. The application server will direct the consumer to one of a plurality of media proxies in a round robin fashion. The media proxy may then set up and tear down the call as is well understood and provide other multimedia related services.

The round robin approach suffers from some drawbacks. First, the round robin approach ignores the loads that are currently being experienced on the media proxies; for instance, there is no provision to evaluate loading on the media proxies before making the assignment. As such, a heavily loaded media proxy may still be assigned to provide services to a consumer just because it is next in the round robin cycle.

Second, the round robin approach ignores distances between the media proxy and the consumer. The distance may be a function of communication links, physical distance, and similar physical attributes. Distance introduces delay into the provision of services, which for multimedia applications can be extremely undesirable. The round robin approach assigns a media proxy to a consumer irrespective of whether another media proxy might be closer.

Thus, there is a need for a better technique to allocate media proxies to incoming requests.

SUMMARY OF THE INVENTION

The present invention addresses the shortcomings of the round robin approach by determining which media proxy is "closest" to the client and assigning that media proxy to the client. Initially, a proximity server, which in a preferred embodiment is a database server, associated with an application determines a round trip time required for a message to go from the database server to each media proxy and back. Subsequently, the application server may receive a request for multimedia services from a client. The application server returns a list of available media proxies to the client for which the database server has the round trip times. The client then sends out a probe query to each media proxy on the list. The media proxies, upon receipt of the probe, send a time-stamped message to the database server. The database server determines which media proxy is closest to the client based on the round trip times and the time required for the media proxy to receive the probe query from the client. After the determination, the application server assigns the client to a media proxy and the media services are provided as requested.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
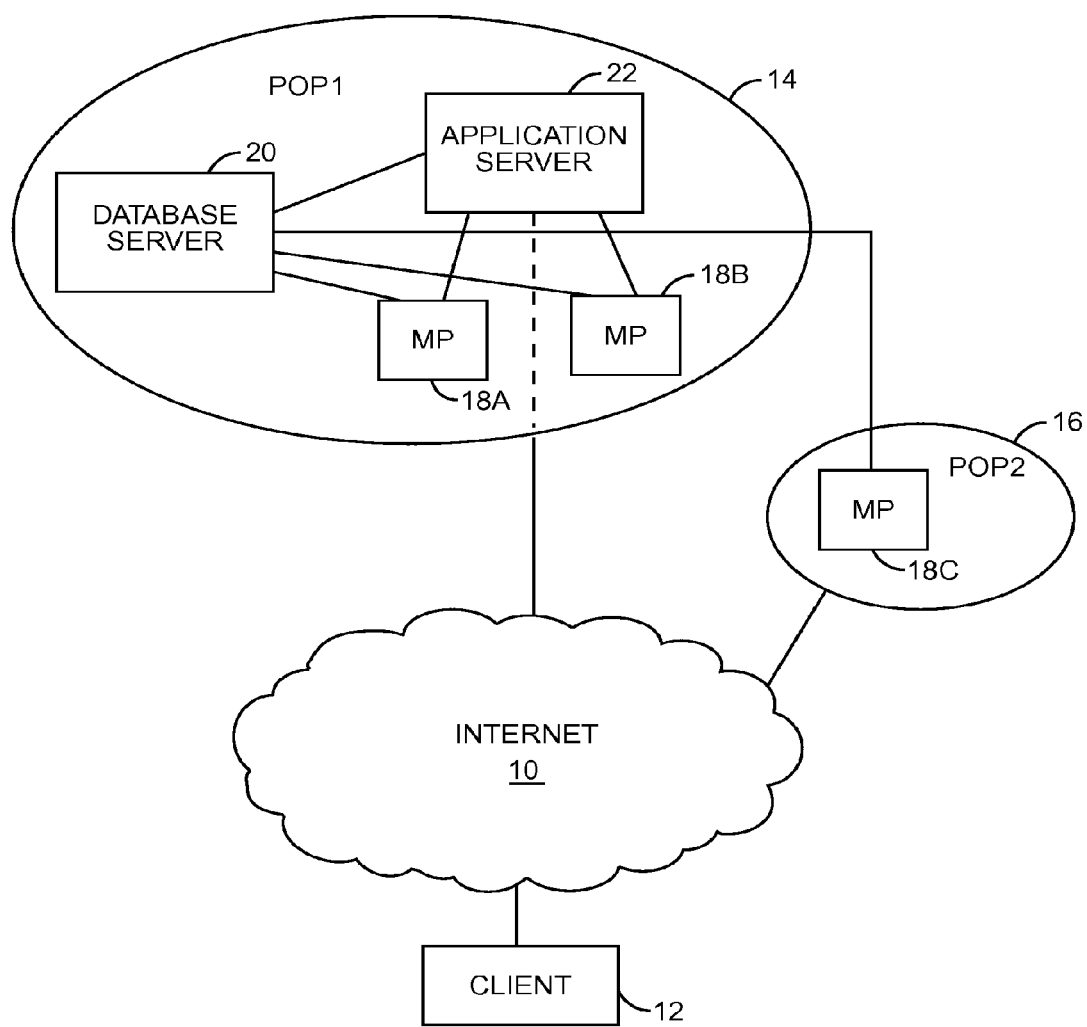
FIG. 1 illustrates a network according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Before discussing how the present invention works, an explanation of the network environment is presented so as to help understand the context of the present invention. A network 10 may be the public internet (shown), a private intranet, or other network through which various elements may interact, such as through any appropriate packet based protocol. A client 12 may be communicatively coupled to the network 10. The client 12 may be a personal computer, a multimedia enabled phone, or other multimedia enabled customer premises equipment. One or more points of presence (POPs) 14, 16 may be associated with one or more service providers. The POPs 14, 16 may have one or more media proxies (MPs) 18A, 18B, and 18C (hereinafter, generically a media proxy 18) associated therewith, as well as a proximity server 20, which in a preferred embodiment is a database server. In most installations, it is expected that a single application server 22 may control more than one media proxy 18, and further the application server 22 may control media proxies 18 distributed amongst multiple POPs 14, 16. The application server 22 may, in an exemplary embodiment, use Session Initiation Protocol (SIP) for communicating.

For the sake of providing a more complete explanation, a brief digression into the specifics of SIP is herein provided. A SIP endpoint is generally capable of running an application, which is generally referred to as a user agent (UA), and is capable of facilitating media sessions using SIP. User agents register their ability to establish sessions with a SIP proxy (the application server 22 in the present invention) by sending "REGISTER" messages to the SIP proxy. The REGISTER message informs the SIP proxy of one or more SIP universal resource locators (URL) that identify the user agent to the SIP network. The REGISTER message also contains information about how to reach specific user agents over the SIP network by providing the Internet Protocol (IP) address and port that the user agent will use for SIP sessions.

A "SUBSCRIBE" message may be used to subscribe to an application or service provided by a SIP endpoint. Further, "NOTIFY" messages may be used to provide information between SIP endpoints in response to various actions or messages, including REGISTER and SUBSCRIBE messages.

When a user agent wants to establish a session with another user agent, the user agent initiating the session will send an INVITE message to the SIP proxy and specify the targeted user agent in the "TO:" header of the INVITE message. Identification of the user agent takes the form of a SIP URL. In its simplest form, the URL is represented by a number or "<username>@<domain>," such as "janedoe@nortelnetworks.com." Generally, the user name is unique within the name space of the specified domain.

If the targeted user agent has registered with the SIP proxy, the SIP proxy will forward any received INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

Returning now to the present invention, the proximity server 20 has a pre-configured list of media proxies 18, and more specifically, a list of addresses and ports on the media proxies 18 that serve the domains served by the application server 22. Further, at least one port on each media proxy 18 is reserved for running the proximity detection method of the present invention.

Note that, in general, the client 12, the media proxy 18, the proximity server 20, and the application server 22 all may contain data processing devices, such as a microprocessor. Further, the microprocessor may be controlled by software or hardware that performs the functions of the present invention. The software may be stored on any appropriate computer readable medium such as a hard drive, a disc, or other memory device. Note further that it is possible that the proximity server 20 and the application server 22 be collocated or integrated into a single entity, but such is not required. The proximity server is one possible host for the proximity detection algorithm. The algorithm is independent of any platform.

Figure 2:
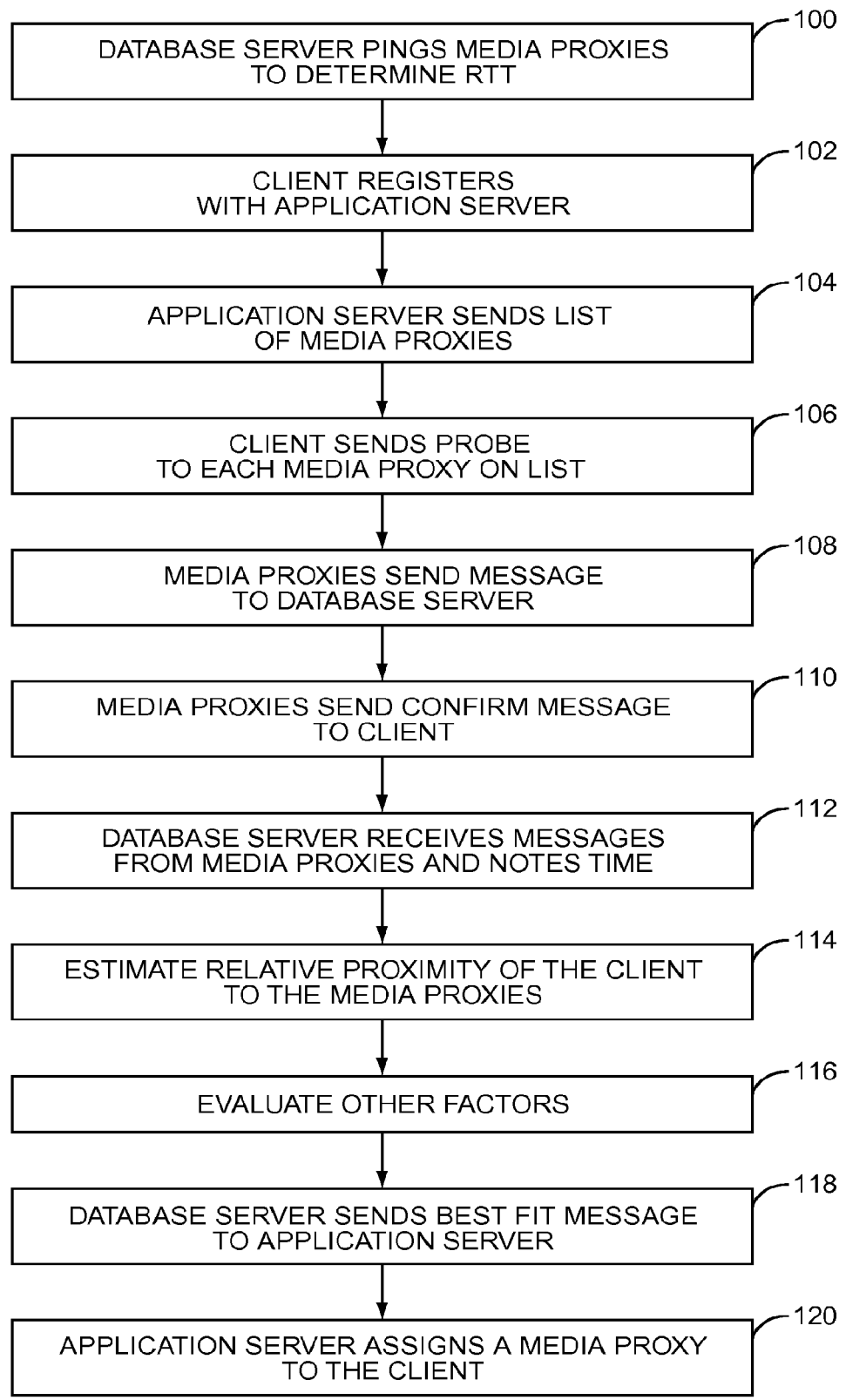
FIG. 2 illustrates, as a flow chart, the methodology of the present invention.
Figure 3:
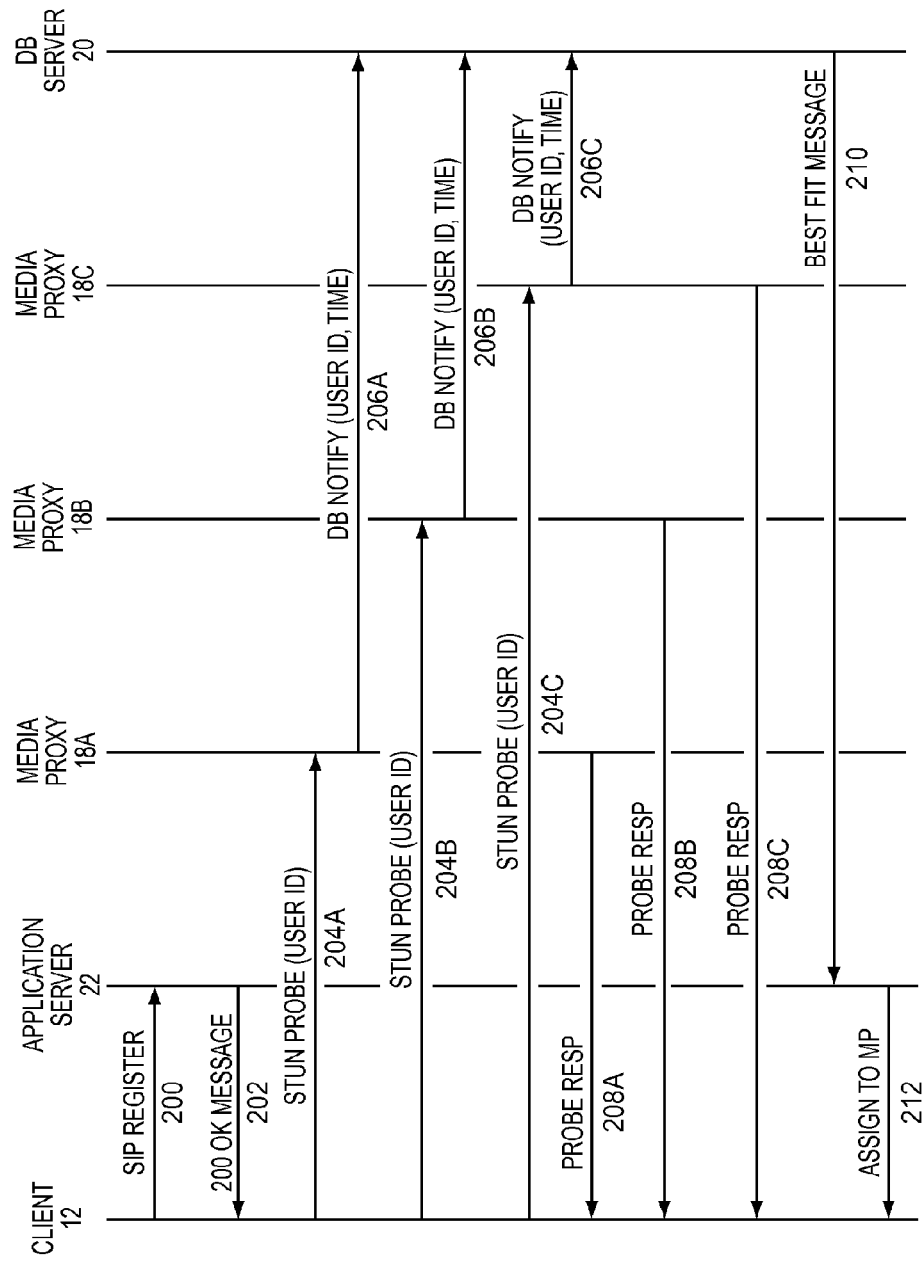
FIG. 3 illustrates a call flow diagram associated with the exemplary embodiment of FIG. 2.

The methodology of the present invention will now be presented with reference to FIGS. 2 and 3. FIG. 2 is a flowchart of the methodology and FIG. 3 shows the call flows. Steps in the flow chart begin with the numeral one, such as block 100, while steps in the call flow begin with the numeral two, such as message 200. While particular protocols and messaging examples are provided, they are intended to be exemplary and assist in comprehension of the steps of the present invention. Other messaging protocols could be used as needed or desired.

In an exemplary embodiment, the proximity server 20 periodically estimates a round trip time (RTT) between the proximity server 20 and each of the media proxies 18 under its jurisdiction (block 100). This RTT estimation may be done using an Internet Control Message Protocol (ICMP) ping as is well understood. At some time subsequent to the estimation of the RTT, a client 12, which may be a SIP client, sends a SIP REGISTER message (200) requesting registration with the application server 22 (block 102) as part of a request for multimedia services. The application server 22 sends the pre-configured list of addresses (including port addresses, if appropriate) to the client 12 for media proxies 18 that are available to serve the domain from which the client's request originates (block 104). This list of media proxies 18 can be sent in the body of the 200 OK response to the REGISTER message (202).

The client 12 sends a Simple Traversal of UDP Through Network Address Translators (STUN), ICMP ping, or an application layer probe message (204A, 204B, 204C) to all of the media proxies 18 in the list received from the application server 22 (block 106). This message may include the user identification (USER ID) of the client 12. The probe may be sent out essentially simultaneously.

Each media proxy 18, upon receiving the probe message, sends a notification message (206A, 206B, 206C) reporting the probe event to the proximity server 20 (block 108). This notification message may contain the user identification of the client 12 that triggered the event, as well as a timestamp (TIME). The media proxy 18 also sends back an acknowledgement (208A, 208B, 208C) to the client 12 (block 110) probe. The acknowledgement informs the client 12 which media proxies 18 are reachable. Optionally, the media proxy 18 may include in the notification message (206A, 206B, 206C) a timestamp delta representing the time between the receipt of the client probe and the time of sending the notification message to the proximity server 20. In an exemplary embodiment, the timestamp delta value has a granularity of milliseconds, although finer gradations could be used.

The proximity server 20 notes the time of receipt of the notification messages (block 112). The proximity server 20 then uses these values and the round trip time (RTT) previously gathered for each of the media proxies 18 to estimate the relative proximities of the client 12 to each of the media proxies 18 (block 114). While there may be several ways to estimate the proximity, an exemplary method to estimate the proximity is as follows.

$RTT\_A$, $RTT\_B$, and $RTT\_C$ are the RTTs for the media proxies 18A, 18B, and 18C, respectively. TA, TB, and TC are the recorded times at the proximity server 20 representing the receipt of the notification messages. The relative proximity values may thus be computed as:

i. Prox (A, B)=(TA−TB)−(RTT_A−RTT_B)
   ii. Prox (A,C)=(TA−TC)−(RTT_A−RTT_C)
   iii. Prox (B, C)=(TB−TC)−(RTT_B−RTT_C)

Note that if the timestamp deltas are present, they may be subtracted out of the calculation for greater accuracy. For example, if $\Delta_A$ and $\Delta_B$ are present, then Prox (A, B)=(TA−TB)−(RTT_A−RTT_B)−($\Delta_A$−$\Delta_B$). Following the rule that if Prox (A, B)<0 (or negative), then media proxy 18A is relatively closer to the client 12 than media proxy 18B, the following table may be constructed.

| Prox (A, B) | Prox (A, C) | Prox (B, C) | Relative Proximities from client |
|---|---|---|---|
| − | − | − | A < B < C |
| − | − | + | A < C < B |
| − | + | − | ERROR |
| − | + | + | C < A < B |
| + | − | − | B < A < C |
| + | − | + | ERROR |

| Prox (A, B) | Prox (A, C) | Prox (B, C) | Relative Proximities from client |
|---|---|---|---|
| + | + | − | B < C < A |
| + | + | + | C < B < A |

In the event of the two error cases, the relative proximities cannot be properly determined, and the RTTs of the media proxies 18 may be used to represent client 12 proximity. Using the RTTs is a good approximation so long as the proximity server 20 is located close to the client 12. Note that this proximity detection may, in an exemplary embodiment, only be performed once per registration.

Armed with the relative proximities, the proximity server 20 may then evaluate other factors (block 116), which include such relatively static factors as: 1) the number of hops between the media proxy 18 and the client 12 and 2) media proxy 18 capacity. Additional dynamic parameters may include the number of User Data Protocol (UDP) ports available, the processing power available, the bandwidth available, and statistics relating to jitter, delay, and packet loss at each port. These additional factors may be normalized and weighted as needed or desired to effectuate an appropriate analysis of the suitability of assigning a client 12 to a given media proxy 18.

The proximity server 20 then sends a best fit message (210) to the application server 22 (block 118). The best fit message (210) indicates which media proxy 18 is most appropriate for the client 12 to use and is based on the proximity and the additional factors outlined above.

The application server 22 then instructs with message 212 the client 12 to use the selected media proxy 18 (block 120). Note that the proximity server 20 could provide the instruction to the client 12. Likewise, the processing of the proximity calculations could be performed in the application server 22, although such is not preferred.

Appropriate authentication or encryption steps may be taken to prevent duplication of the user identification that may be sent in some of the various messages. Likewise, denial of service attacks may be prevented in standard ways, such as monitoring traffic levels.

Those skilled in the art will recognize improvements and modifications to the preferred embodiments of the present invention. All such improvements and modifications are considered within the scope of the concepts disclosed herein and the claims that follow.

What is claimed is:

1. A method of assigning a media proxy to a client based on proximity of the media proxy, comprising:
a first server receiving a request from the client for a media session;
the first server transmitting a list of media proxies to the client, wherein the client is configured to transmit a request to each of a plurality of media proxies in the list of media proxies;
the first server receiving a plurality of messages from the plurality of media proxies in the list of media proxies in response to requests sent from the client to the plurality of media proxies in the list of media proxies;
the first server determining proximity between the client and each of the plurality of media proxies based on the plurality of messages received from the plurality of media proxies; and
the first server assigning a first media proxy of the list of media proxies based on determined proximity between the client and each of the one or more media proxies.

2. The method of claim 1, wherein said determining the proximity between the client and each of the plurality of messages is performed based on times of receipt of responses received from the plurality of media proxies.

3. The method of claim 1, wherein said determining the proximity between the client and each of the plurality of messages is performed based on round trip times to and from the one or more media proxies.

4. The method of claim 1, wherein said determining the proximity between the client and each of the plurality of messages is performed based on:
times of receipt of responses received from the plurality of media proxies; and
round trip times to and from the one or more media proxies;
wherein the proximity between the client and each of the one or more media proxies is determined by a proximity server, wherein the times of receipt of the responses are detected by the proximity server receiving the responses, and wherein the round trip times to and from the one or more media proxies is relative to the proximity server.

5. The method of claim 1, wherein the first server comprises an application server.

6. The method of claim 1, wherein the request from the client comprises a session initiation protocol (SIP) request.

7. A first server, comprising:
communication circuitry configured to communicate with a client; and
processing hardware coupled to the communication circuitry, wherein the processing hardware is configured to:
receive a request from the client for a media session;
transmit a list of media proxies to the client, wherein the client is configured to transmit a request to each of a plurality of media proxies in the list of media proxies;
receive a plurality of messages from the plurality of media proxies in the list of media proxies in response to requests sent from the client to the plurality of media proxies in the list of media proxies;
determine proximity between the client and each of the plurality of media proxies based on the plurality of messages received from the plurality of media proxies; and
assign a first media proxy of the list of media proxies based on determined proximity between the client and each of the one or more media proxies.

8. The first server of claim 7, wherein determining the proximity between the client and each of the plurality of messages is performed based on times of receipt of responses received from the plurality of media proxies.

9. The first server of claim 7, wherein said determining the proximity between the client and each of the plurality of messages is performed based on round trip times to and from the one or more media proxies.

10. The first server of claim 7, wherein said determining the proximity between the client and each of the plurality of messages is performed based on:
times of receipt of responses received from the plurality of media proxies; and
round trip times to and from the one or more media proxies;
wherein the proximity between the client and each of the one or more media proxies is determined by a proximity server, wherein the times of receipt of the responses are detected by the proximity server receiving the responses, and wherein the round trip times to and from the one or more media proxies is relative to the proximity server.

11. The first server of claim 7, wherein the first server comprises an application server.

12. The first server of claim 7, wherein the request from the client comprises a session initiation protocol (SIP) request.

13. A non-transitory, computer accessible memory medium storing program instructions for assigning a media proxy to a client based on proximity of the media proxy, wherein the program instructions are executable by a processor to:

receive a request from the client for a media session;

transmit a list of media proxies to the client, wherein the client is configured to transmit a request to each of a plurality of media proxies in the list of media proxies;

receive a plurality of messages from the plurality of media proxies in the list of media proxies in response to requests sent from the client to the plurality of media proxies in the list of media proxies;

determine proximity between the client and each of the plurality of media proxies based on the plurality of messages received from the plurality of media proxies; and assign a first media proxy of the list of media proxies based on determined proximity between the client and each of the one or more media proxies.

14. The non-transitory, computer accessible memory medium of claim 13, wherein determining the proximity between the client and each of the plurality of messages is performed based on times of receipt of responses received from the plurality of media proxies.

15. The non-transitory, computer accessible memory medium of claim 13, wherein said determining the proximity between the client and each of the plurality of messages is performed based on round trip times to and from the one or more media proxies.

16. The non-transitory, computer accessible memory medium of claim 13, wherein said determining the proximity between the client and each of the plurality of messages is performed based on:

times of receipt of responses received from the plurality of media proxies; and round trip times to and from the one or more media proxies;

wherein the proximity between the client and each of the one or more media proxies is determined by a proximity server, wherein the times of receipt of the responses are detected by the proximity server receiving the responses, and wherein the round trip times to and from the one or more media proxies is relative to the proximity server.

17. The non-transitory, computer accessible memory medium of claim 13, wherein the program instructions are executable by an application server.

* * * * *